United States Patent
Michikawauchi

(10) Patent No.: US 9,758,017 B2
(45) Date of Patent: Sep. 12, 2017

(54) REFRIGERANT CIRCULATION SYSTEM

(71) Applicant: TOYOTA JIDOSHA KABUSHIKI KAISHA, Toyota-shi, Aichi-ken (JP)

(72) Inventor: Ryo Michikawauchi, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 37 days.

(21) Appl. No.: 14/874,732

(22) Filed: Oct. 5, 2015

(65) Prior Publication Data

US 2016/0096414 A1  Apr. 7, 2016

(30) Foreign Application Priority Data

Oct. 7, 2014  (JP) ................................. 2014-206326

(51) Int. Cl.
| | |
|---|---|
| *B60H 1/00* | (2006.01) |
| *F01P 11/16* | (2006.01) |
| *F16K 11/08* | (2006.01) |
| *F01P 7/14* | (2006.01) |

(52) U.S. Cl.
CPC .......... *B60H 1/00885* (2013.01); *F01P 11/16* (2013.01); *F16K 11/08* (2013.01); *F01P 2007/146* (2013.01); *F01P 2025/62* (2013.01); *F01P 2025/64* (2013.01); *F01P 2060/08* (2013.01)

(58) Field of Classification Search
CPC .................. F25B 2327/001; F01P 11/16; F01P 2007/146; F01P 2060/08
See application file for complete search history.

(56) References Cited

U.S. PATENT DOCUMENTS

| | | | |
|---|---|---|---|
| 7,984,700 B2* | 7/2011 | Chanfreau | B60H 1/00485 123/41.08 |
| 2004/0103947 A1* | 6/2004 | McLane | B60H 1/00485 137/625.47 |
| 2004/0173167 A1 | 9/2004 | Chanfreau et al. | |
| 2006/0201455 A1 | 9/2006 | Chanfreau et al. | |

FOREIGN PATENT DOCUMENTS

| | | |
|---|---|---|
| JP | H10-131753 A | 5/1998 |
| JP | 4151445 B2 | 9/2008 |
| JP | 2013-234605 A | 11/2013 |
| WO | 03006857 A1 | 1/2003 |

* cited by examiner

*Primary Examiner* — Hai Huynh
*Assistant Examiner* — Long T Tran
(74) *Attorney, Agent, or Firm* — Andrews Kurth Kenyon LLP

(57) ABSTRACT

In order to shift a rotation angle of a rotor to a region of a normal mode (for example, a region c) from a region of a heater cut mode (for example, a region e), the rotation angle needs to pass through a region where a flow rate of a refrigerant which is caused to flow through all branch channels becomes zero (a region d). When the refrigerant has a high temperature, there is a possibility of the refrigerant being not cooled, and boiling. Therefore, when a request to switch a normal mode and a heater cut mode is issued, permission/non-permission of switch of the mode is determined by comparison of a temperature of the refrigerant detected by the temperature sensor 26 and an upper limit temperature of the refrigerant.

2 Claims, 6 Drawing Sheets

REFRIGERANT CIRCULATION SYSTEM

CROSS-REFERENCE TO RELATED APPLICATION

The present application claims priority to Japanese Patent Application No. 2014-206326 filed on Oct. 7, 2014, which is incorporated herein by reference in its entirety.

BACKGROUND

Technical Field

The present invention relates to a refrigerant circulation system, and more particularly relates to a system that circulates a refrigerant that cools an internal combustion engine.

Background Art

Conventionally, there has been disclosed a refrigerant circulation system that causes a refrigerant, which passes through a main body of an engine, to pass through three refrigerant circuits by an electronic control valve and return to the engine, for example, in JP 2013-234605 A. More specifically, the system includes the first refrigerant circuit provided with a radiator, the second refrigerant circuit provided with a heater, and the third refrigerant circuit provided with an oil cooler, and the electronic control valve includes three branch valves that open and close the respective refrigerant circuits. In the system, the opening degrees of the respective branch valves are independently controlled, and therefore, the flow rates of the refrigerant which is caused to flow into the respective refrigerant circuits can be individually controlled.

Further, JP 10-131753 A discloses a refrigerant circulation system including a refrigerant circuit in which a refrigerant flows, which is passed through both an engine and a radiator, a bypass channel that bypasses the radiator in a midpoint in the refrigerant circuit, and a flow rate control valve that is provided in the bypass channel. In the system, the flow rate control valve is configured by a valve housing, and a rotary type rotor that is installed in the valve housing to be capable of rotational operation. By rotating the rotor, opening and closing states of the refrigerant circuit and the bypass channel can be controlled.

Incidentally, when the electronic control valve in Patent Literature 1 described above is configured by the flow rate control valve in Patent Literature 3 described above, the installation space for the control valve can be saved. Further, the above described flow rate control valve is provided in the installation place of the above described electronic control valve, the opening and closing states of the respective refrigerant circuits can be controlled by rotation of the above described rotor. Therefore, the refrigerant is caused to flow into the oil cooler by opening the above described third refrigerant circuit at a time of start-up of the engine, for example, whereby the oil temperature is increased, and fuel efficiency can be enhanced. Further, the refrigerant is caused to pass through the heater by opening the above described second refrigerant circuit at a time of request for a heater, for example, whereby the in-vehicle air temperature can be increased. From the viewpoint like this, the present inventor is now conducting a study on control of the opening and closing states of the respective refrigerant circuits based on the operation plan in which the opening and closing states are set by being related with the rotation angle of the flow rate control valve from the reference position.

However, in the process of the study of the operation plan, it becomes clear that the following problem arises. That is to say, when the above described rotor is rotated based on the above described operation plan, there arises the situation where all of the refrigerant circuits are closed due to the structure of the above described rotor. Even if all of the refrigerant circuits are closed, no particular problem arises when the refrigerant has a low temperature. However, when the refrigerant has a high temperature, if all of the refrigerant circuits are closed, the refrigerant is not cooled and is likely to be boiled. Accordingly, it is not desirable that the all-closed state like this is brought about even if it is only temporary.

LIST OF RELATED ART

Following is a list of patent literatures which the applicant has noticed as related arts of the present invention.
[Patent Literature 1] Japanese Patent Laid-Open No. 2013-234605
[Patent Literature 2] Japanese Patent No. 4151445
[Patent Literature 3] Japanese Patent Laid-Open No. 10-131753

SUMMARY

The invention is made to solve the problem as described above. That is to say, an object of the invention is to avoid boiling of the refrigerant resulting from closure of all refrigerant circuits in a refrigerant circulation system that controls opening and closing states of a plurality of refrigerant circuits by a control valve equipped with a rotor.

A first aspect of the present application is a refrigerant circulation system, comprising:

a first refrigerant circuit for returning a refrigerant that passes through a main body of an internal combustion engine to the main body after causing the refrigerant to perform heat exchange with a first heat exchanger;

a control valve that is provided in the first refrigerant circuit, and includes a rotor that rotates around a rotation axis;

a second refrigerant circuit that is connected to the control valve, and is for returning the refrigerant which passes through the main body to the main body after causing the refrigerant to perform heat exchange with a second heat exchanger; and a controller programmed to control a rotational operation of the rotor, based on an operation plan that is set by relating opening and closing states of the first refrigerant circuit and the second refrigerant circuit with a rotation angle of the rotor from a reference position, wherein the operation plan comprises an all passing mode that changes both channels of the first refrigerant circuit and the second refrigerant circuit from a state in which both the channels of the first refrigerant circuit and the second refrigerant circuit are closed to a state in which both the channels are opened, and a partial cutoff mode that changes both the channels from the state in which both the channels are closed to a state in which only the first refrigerant circuit is opened, and the controller is programmed to prohibit rotation of the rotor following a mode switch request, when a temperature of the refrigerant which passes through the main body is higher than an upper limit temperature of the refrigerant which is determined based on an operating state of the internal combustion engine, in a case where the mode switch request to switch the all passing mode and the partial cutoff mode is issued.

A second aspect of the present application is the refrigerant circulation system according to the first aspect, wherein the control valve is configured to change an opening area of the first refrigerant circuit and an opening area of the second refrigerant circuit by the rotation of the rotor, the first heat exchanger is a radiator to cool the refrigerant by heat exchange with outside air, and the controller is programmed to rotate the rotor in a direction to increase the opening area of the first refrigerant circuit when an elapsed time period after the mode switch request being issued exceeds a predetermined time period in a case of prohibiting the rotation of the rotor following the mode switch request.

According to the first aspect, in the refrigerant circulation system which controls the opening and closing states of the first refrigerant circuit and the second refrigerant circuit based on the operation plan in which the opening and closing states are set by being related with the rotation angle of the rotor from the reference position, in the case where the mode switch request to switch the all passing mode and the partial cutoff mode, rotation of the rotor following the mode switch request can be prohibited when the temperature of the refrigerant which passes through the engine main body is higher than the upper limit temperature of the refrigerant, which is determined based on the operating state of the internal combustion engine. Accordingly, boiling of the refrigerant resulting from the first refrigerant circuit and the second refrigerant circuit being closed can be avoided.

According to the second aspect, when the elapsed time period after the above described mode switch request being issued exceeds the predetermined time period, in the case where the rotation of the rotor following the above described mode switch request is prohibited, the rotor can be rotated in the direction to increase the opening area of the first refrigerant circuit which is provided with the radiator. If the opening area of the first refrigerant circuit is increased, heat exchange is performed between the outside air and the refrigerant, and the temperature of the refrigerant can be reduced in a short time period. Accordingly, the situation incapable of respond to the above described mode switch request can be eliminated at an early stage.

DETAILED DESCRIPTION

Hereinafter, embodiments of the present invention will be described based on the drawings. Note that common elements in the respective drawings are assigned with the same reference signs and redundant explanation will be omitted. Further, the present invention is not limited by the following embodiments.

First Embodiment

[Explanation of System Configuration]

First of all, with reference to FIGS. 1 to 5, a first embodiment of the present invention will be described.

Figure 1:
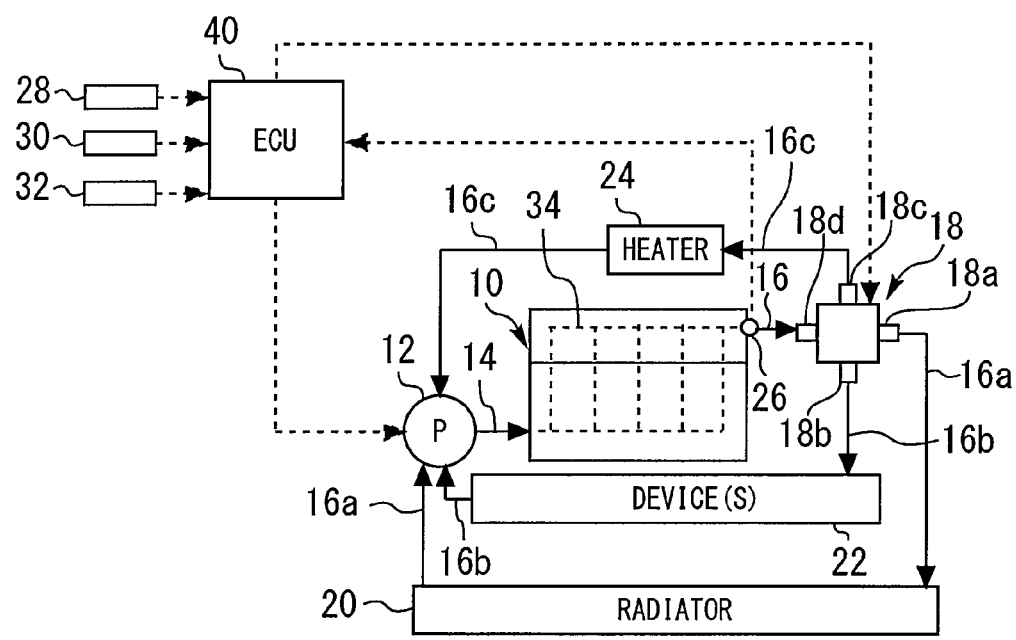
FIG. 1 is a diagram for explaining a configuration of a refrigerant circulation system of the first embodiment of the present invention.

FIG. 1 is a diagram for explaining a configuration of a refrigerant circulation system of the first embodiment of the present invention. As shown in FIG. 1, the refrigerant circulation system of the present embodiment includes an engine 10 as an internal combustion engine which is loaded on a vehicle. A water jacket 34 is provided in a main body (a cylinder block and a cylinder head) of the engine 10. Heat exchange is performed between a refrigerant (cooling water) that flows in the water jacket 34 and the engine 10.

The refrigerant which flows in the water jacket 34 is supplied from an electric water pump 12. The water pump 12 includes an impeller that feeds the refrigerant by rotation, and a motor that rotates the impeller (both not illustrated). By electrically controlling the rotation of the motor, a flow rate and a discharge pressure of the refrigerant which is discharged from the water pump 12 are changed.

An inlet portion of the water jacket 34 and a discharge port (not illustrated) of the water pump 12 are connected by a supply channel 14. A return channel 16 is connected to an outlet portion of the water jacket 34. The return channel 16 branches into three channels 16a to 16c halfway. The branch channels 16a to 16c are independently connected to a suction port (not illustrated) of the water pump 12. That is to say, the refrigerant circulation system of the present embodiment includes three refrigerant circulation channels in which the supply channel 14, the water jacket 34 and the return channel 16 are common, and the branch channels 16a to 16c are independent.

A first circulation channel causes the refrigerant to pass through a radiator 20 that is provided in the branch channel 16a. When the refrigerant is caused to pass through the radiator 20, heat exchange is performed between outside air and the refrigerant. A second circulation channel causes the refrigerant to pass through a device 22 that is provided in the branch channel 16b. The device 22 includes an oil cooler, an EGR cooler, an ATF (automatic transmission fluid) cooler and the like. When the refrigerant is caused to pass through the device 22, heat exchange is performed between fluids (oil, an EGR gas and the like) that flow in the device 22 and the refrigerant. A third circulation channel causes the refrigerant to pass through a heater 24 for in-vehicle air-conditioning that is provided in the branch channel 16c. When the refrigerant is caused to pass through the heater 24, heat exchange is performed between in-vehicle heating air and the refrigerant.

A rotary valve 18 is provided in a portion where the first to the third circulation channels are branched, that is, a portion where the return channel 16 branches into the branch channels 16a to 16c. The rotary valve 18 includes a valve body having discharge ports 18a to 18c and an inflow port 18d, a rotor that is accommodated in the valve body to be rotatable around a rotation axis, and a motor that rotates the rotor (all of which are not illustrated). When the rotor is rotated by the motor, opening areas between the respective discharge ports, and the inflow port 18 are changed, and communication states of the respective discharge ports and the inflow port 18d are changed. That is to say, the opening areas of the respective branch channels are changed, and the opening and closing states of the respective branch channels are changed. According to the rotary valve 18, the flow rate of the refrigerant to be caused to flow into each of the branch channels, distribution of heat to a heat exchanger of each the branch channels, a temperature of the refrigerant which is circulated in the refrigerant circulation system can be controlled.

The refrigerant circulation system of the present embodiment further includes an ECU (Electronic Control Unit) 40. The ECU 40 includes at least an input/output interface, a memory and a CPU. The input/output interface is provided to take in sensor signals from various sensors, and output operation signals to actuators. The sensors from which the ECU 40 takes in signals include a temperature sensor 26 provided at the outlet portion of the water jacket 34, a crank angle sensor 28 for detecting a rotational speed of the engine 10, an opening degree sensor 30 for detecting an opening degree of a throttle valve (not illustrated), a switch 32 for turning on and off an in-vehicle air conditioner and the like. The actuators to which the ECU 40 outputs operation signals include the motor of the aforementioned water pump 12, and the motor of the rotary valve 18. A memory stores a control program that sets an opening degree schedule that will be described later, various maps and the like. The CPU reads the control program or the like from the memory and executes the control program or the like, and generates operation signals based on the sensor signals which the CPU takes in.

[Feature of First Embodiment]

As described above, according to the rotary valve 18, the refrigerant is caused to pass through the device 22 and heat exchange can be performed between the refrigerant and the fluids flowing in the device 22. Therefore, engine oil and an EGR gas are cooled, and fuel efficiency can be enhanced. Further, the refrigerant is caused to pass through the heater 24 and heat exchange can be performed between the refrigerant and the in-vehicle heating air. Therefore, the in-vehicle air is warmed, or the in-vehicle temperature at a time of use of a cooler can be regulated. From the viewpoint as above, in order to make fuel efficiency and air-conditioning performance compatible, the present inventor is conducting a study on control of the opening and closing states of the respective branch channels based on an operation plan of the rotor in which the opening and the closing states are set by being related with a rotation angle (hereinafter, described as "a rotation angle of the rotor") of the rotor of the rotary valve 18 from a reference position. The operation plan will be described with reference to FIG. 2.

Figure 2:
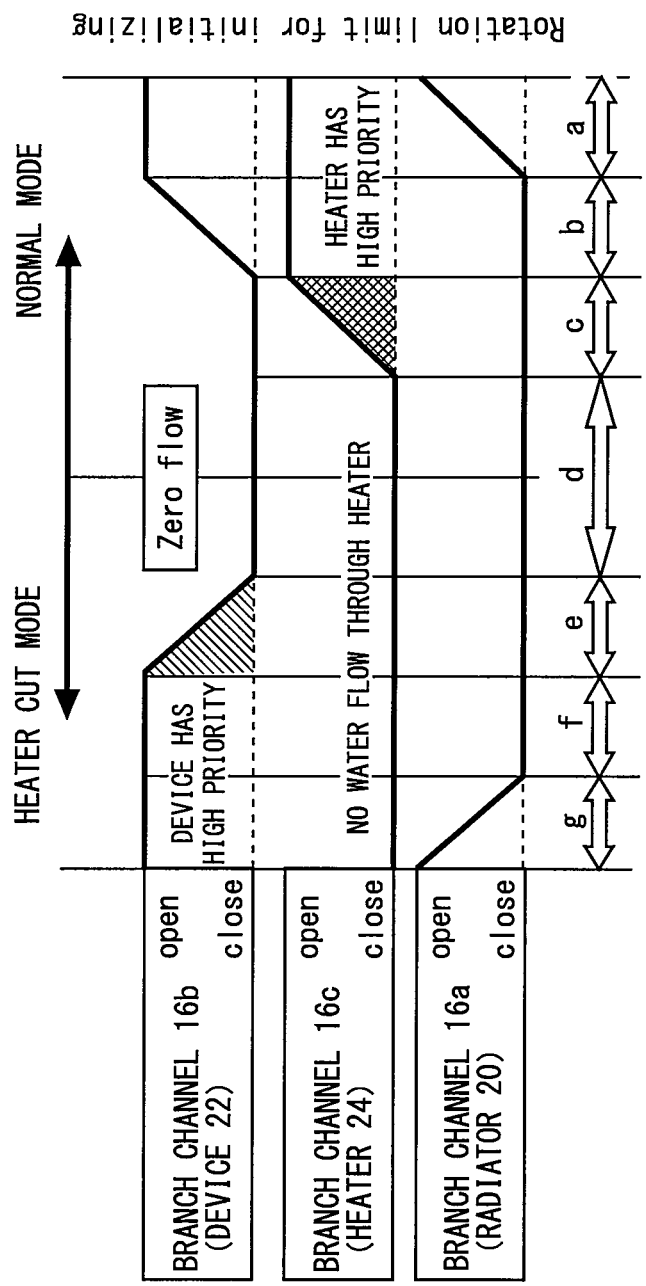
FIG. 2 is a diagram showing the operation plan of the rotor of the rotary valve 18.

FIG. 2 is a diagram showing the operation plan of the rotor of the rotary valve 18. A horizontal axis in FIG. 2 represents the rotation angle of the rotor, and a vertical axis represents changes of the opening and closing states of the respective branch channels. The operation plan is configured by a normal mode that is used in a case where there is a request to cause the refrigerant to pass through the heater 24 (hereinafter, described as "a heater request"), and a heater cut mode that is used in a case where there is no heater request. The normal mode and the heater cut mode are separated by a region (a region d) in which all the branch channels are closed, and the flow rates of the refrigerant to be caused to flow into all the branch channels become zero.

In the normal mode, passage of the refrigerant to the heater 24 is given the highest priority. In FIG. 2, when the rotor is rotated in a direction to advance to the right from the region d, the rotation angle of the rotor shifts to a region (a region c) adjacent to the region d. In the region c, the branch channel 16c starts to open, and the refrigerant starts to pass through the heater 24. When the rotor is further rotated therefrom, the branch channel 16c completely opens, and the rotation angle of the rotor shifts to a region (a region b) adjacent to the region c. In the region b, the branch channel 16b starts to open, and the refrigerant starts to pass through the device 22. When the rotor is further rotated therefrom, the branch channel 16b completely opens, and the rotation angle of the rotor shifts to a region (a region a) adjacent to the region b. In the region a, the branch channel 16a starts to open, and the refrigerant starts to pass through the radiator 20. When the rotor is further rotated therefrom, the branch channel 16a completely opens. A position of the rotation angle of the rotor where the branch channel 16a is completely opened corresponds to a rotation limit (Rotation limit) of the rotor, and the operation plan is formulated with the rotation limit as the aforementioned reference position.

In the heater cut mode, passage of the refrigerant to the heater 24 is not performed, and passage of the refrigerant to the device 22 is given higher priority than the radiator 20. In FIG. 2, when the rotor is rotated in a direction to advance to the left from the region d, the rotation angle of the rotor shifts to a region (a region e) adjacent to the region d. In the region e, the branch channel 16b starts to open, and the refrigerant starts to pass through the device 22. When the rotor is further rotated therefrom, the branch channel 16b completely opens, and the rotation angle of the rotor shifts to a region (a region f) adjacent to the region e. In the region f, only the branch channel 16b opens, and the refrigerant passes through only the device 22. When the rotor is further rotated therefrom, the rotation angle of the rotor shifts to a region (a region g) adjacent to the region f. In the region g, the branch channel 16a starts to open, and the refrigerant starts to pass through the radiator 20. When the rotor is further rotated therefrom, the branch channel 16a completely opens.

According to the operation plan shown in FIG. 2, it becomes possible to make fuel efficiency and air-conditioning performance compatible. However, it becomes clear that a problem as follows arises when the switch of the mode is performed, in a case of using the operation plan. That is to say, when the switch 32 is operated to be on by an operator, the heater request is issued, and the mode switch from the heater cut mode to the normal mode is performed. For example, when the heater request is issued when the rotation angle of the rotor is in the region e, the rotation angle of the rotor is shifted to the region c by rotating the rotor. Further, when the switch 32 is operated from on to off by the operator, the heater request is ended, and the mode is switched from the normal mode to the heater cut mode. For example, when the heater request is ended when the rotation angle of the rotor is in the region c, the rotation angle of the rotor is shifted to the region e by rotating the rotor.

Here, in order to shift the rotation angle of the rotor from the region e to the region c, or from the region c to the region e, the rotation angle has to pass through the region d. Since shift between the region e and the region c is completed in a short time period, the time taken to pass through the region d is also small. However, when the refrigerant has a high temperature, the refrigerant is not cooled, and is likely to be boiled, and therefore, passing through the region d is not desirable from the viewpoint of ensuring reliability of the engine even if it is for only a short period of time. Therefore, in the present embodiment, permission/non-permission of switch of the mode is determined when a request to switch the normal mode and the heater cut mode (hereinafter described as "a mode switch request") is issued.

Figure 3:
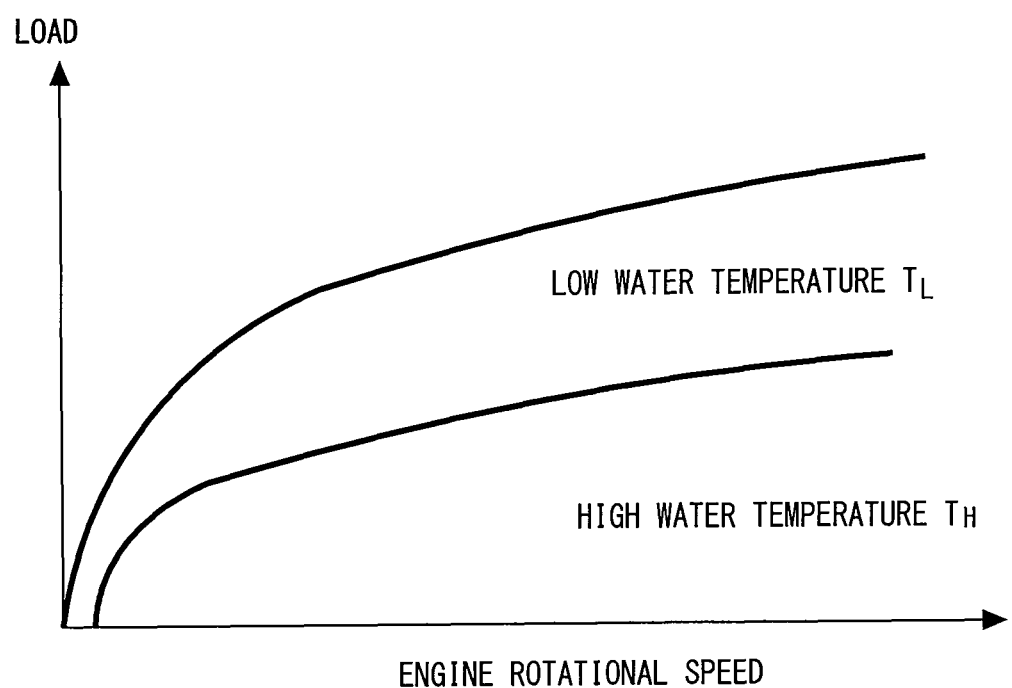
FIG. 3 is a diagram for explaining the upper limit temperature of the refrigerant to be used when permission/non-permission of switch of the mode is determined.

More specifically, determination of permission/non-permission of the mode switch is performed by comparison of a temperature of the refrigerant which is detected by the temperature sensor 26, and an upper limit temperature of the refrigerant. FIG. 3 is a diagram for explaining the upper limit temperature of the refrigerant to be used when permission/non-permission of switch of the mode is determined. As shown in FIG. 3, the upper limit temperature of the refrigerant is set based on the operating state (the load and the rotational speed) of the engine, and a set region thereof is enlarged as the load and the rotational speed become higher. Further, two of the upper limit temperatures of the refrigerant are set. At a time of a low load, a heat reception amount of the refrigerant is smaller as compared with at a time of a high load, and therefore the refrigerant is difficult to boil. Therefore, as shown in FIG. 3, a region where the upper limit temperature of the refrigerant is made higher as compared with the other regions is provided in a part of a low load region in the set region of the upper temperature (low water temperature $T_L$<high water temperature $T_H$). A relation between the two upper limit temperatures shown in FIG. 3 and the operating state of the engine is stored in the memory of the ECU 40 in a format of a control map.

According to the present embodiment, permission/non-permission of switch of the mode can be determined based on the relation shown in FIG. 3. Therefore, when switch of the mode is determined as non-permitted, rotation of the rotor following the mode switch request is prohibited, and shift of the rotation angle of the rotor to the region d in FIG. 2 can be stopped. Accordingly, boiling of the refrigerant at the time of switch of the mode can be avoided. Consequently, damage and the like of the engine components accompanying boiling of the refrigerant can be prevented.

[Specific Processing]

Figure 4:
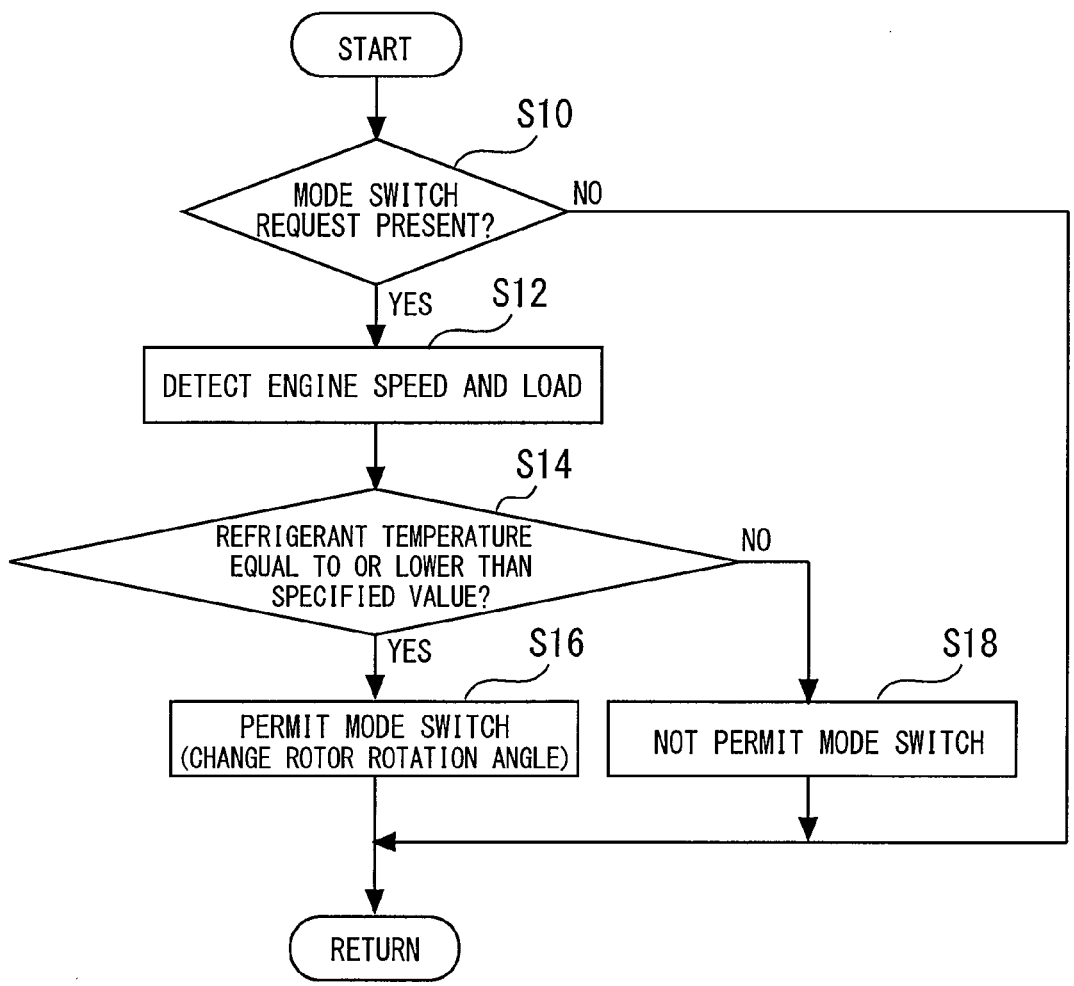
FIG. 4 is a flowchart showing a mode switch determination routine that is executed by the ECU 40 in the first embodiment.

Next, with reference to FIG. 4, specific processing for realizing the aforementioned function will be described. FIG. 4 is a flowchart showing a mode switch determination routine that is executed by the ECU 40 in the first embodiment. The routine shown in FIG. 4 is repeatedly executed at each predetermined control period immediately after a startup of the engine 10.

In the routine shown in FIG. 4, presence or absence of the mode switch request is determined first (step S10). The presence or absence of the mode switch request is determined based on presence or absence of a switch operation of the switch 32. When it is determined that the mode switch request is absent, the present routine is ended.

When it is determined that the mode switch request is present in step S10, the rotational speed and the load of the engine 10 are detected (step S12). In the present step, the rotational speed of the engine 10 is detected based on the output signal from the crank angle sensor 28, and the load of the engine 10 is detected based on the output signal from the opening degree sensor 30.

Subsequently to step S12, it is determined whether or not the temperature of the refrigerant is equal to or smaller than a specified value (step S14). In the present step, the temperature of the refrigerant is detected based on an output signal from the temperature sensor 26. Subsequently, the detected refrigerant temperature and the specified value are compared. The specified value is an upper limit temperature that is determined based on the rotational speed and the load of the engine 10 which are detected in step S12, and the control map which expresses the relation in FIG. 3 (that is, the low water temperature $T_L$ or the high water temperature $T_H$).

When it is determined that the temperature of the refrigerant is equal to or smaller than the specified value in step S14, it can be determined that a possibility of the refrigerant boiling is low even if the mode is switched. Therefore, switch of the mode is permitted (step S16). Thereby, the rotation angle of the rotor is changed, and switch of the mode is executed. On the other hand, when it is determined that the temperature of the refrigerant is higher than the specified value in step S14, it can be determined that a possibility of the refrigerant boiling with switch of the mode is high. Therefore, switch of the mode is not permitted (step S18). Thereby, rotation of the rotor following the mode switch request is prohibited.

As above, according to the routine shown in FIG. 4, boiling of the refrigerant at the time of switch of the mode can be avoided. Accordingly, damage and the like of the engine components accompanying boiling of the refrigerant can be prevented.

In the above described first embodiment, the return channel 16, the branch channel 16a and the supply channel 14 or the return channel 16, and the branch channel 16b and the supply channel 14 correspond to a "first refrigerant circuit" in the above described first aspect. The branch channel 16c and the supply channel 14 correspond to a "second refrigerant circuit" in the above described first aspect. The radiator 20 or the device 22 corresponds to a "first heat exchanger" in the above described first aspect. The heater 24 corresponds to a "second heat exchanger" in the above described first aspect. The rotary valve 18 corresponds to a "control valve" in the above described first aspect. The ECU 40 corresponds to "controller" in the above described first aspect. The normal mode corresponds to an "all passing mode" in the above described first aspect. The heater cut mode corresponds to "a partial cutoff mode" in the above described first aspect.

Incidentally, in the above described first embodiment, the example of using the rotary valve 18 is described, but any valve that can change the opening and closing states of the respective branch channels by rotation of the rotor around the rotation axis such as a ball valve can be used instead of the rotary valve 18. Note that the present modification can be similarly applied to a second embodiment that will be described later.

Figure 5:
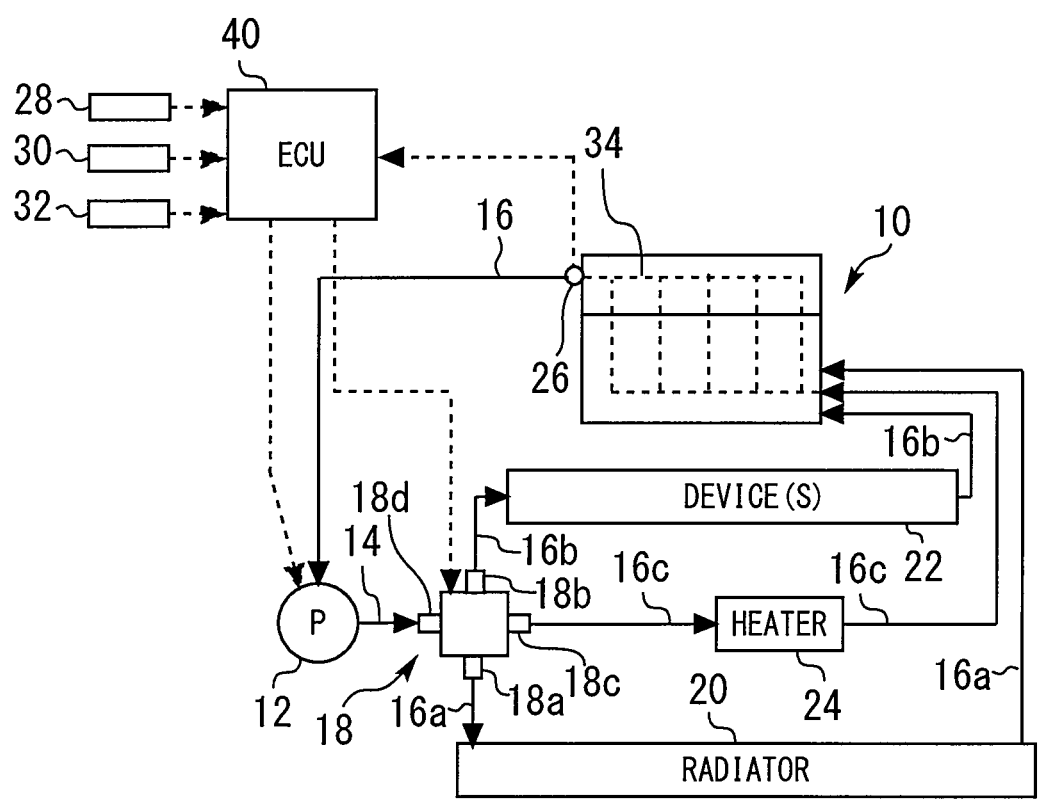
FIG. 5 is a diagram for explaining a modification of the refrigerant circulation system of the first embodiment.

Further, in the above described first embodiment, the return channel 16 is caused to branch into the branch channels 16a to 16c downstream of the return channel 16, and the rotary valve 18 is provided in the branch portion. However, the present invention can be also applied to the refrigerant circulation system shown in FIG. 5. FIG. 5 is a diagram for explaining a modification of the refrigerant circulation system of the first embodiment. In the refrigerant circulation system, the branch channels 16a to 16c are branched downstream of the supply channel 14. The branch channels 16a to 16c are independently connected to the water jacket 34. Further, the rotary valve 18 is provided in a portion where the supply channel 14 branches into the branch channels 16a to 16c. In the system like this, the opening and closing states of the respective branch channels can be also controlled based on the operation plan shown in FIG. 2. The present modification can be similarly applied to the second embodiment that will be described later.

Second Embodiment

Next, with reference to FIG. 6, the second embodiment of the present invention will be described. The present embodiment is on the precondition of the refrigerant circulation system and the operation plan in the above described first embodiment, and therefore explanation thereof will be omitted.

[Feature of Second Embodiment]

In the above described first embodiment, switch of the mode is not permitted when it is determined that the temperature of the refrigerant is higher than the upper limit temperature. However, if any one of the branch channels 16a to 16c communicates with the return channel 16, the refrigerant is cooled, and therefore, the temperature of the refrigerant which is detected by the temperature sensor 26 gradually reduces. Accordingly, when the mode switch request is issued, non-permission of switch of the mode is not continued, but in order to respond to the mode switch request, switch of the mode can be put on standby until the temperature of the refrigerant becomes equal to or lower than the upper limit temperature. However, if the standby time period becomes long, it is not desirable because the situation that is incapable of responding to the mode switch request keeps correspondingly. Therefore, in the present embodiment, when the standby time period becomes long, the rotor is rotated so as to increase an opening area between the exhaust port 18a and the inflow port 18d (that is, the opening area between the branch channel 16a and the return channel 16).

If the opening area between the branch channel 16a and the return channel 16 is increased, more refrigerant can be passed through the radiator 20. Accordingly, heat exchange is performed between the outside air and the refrigerant to reduce the temperature of the refrigerant, and the temperature of the refrigerant can be reduced to the upper limit temperature or lower in a short time period.

However, since the mode switch itself is not permitted, rotation of the rotor for increasing the opening area between the branch channel 16a and the return channel 16 is performed in the mode at the time of the mode switch request being issued. For example, when the rotation angle of the rotor is in the region e in FIG. 2 at the time of the mode switch request being issued, the rotor is rotated so as to shift the rotation angle to the region g in the same mode as the region e, that is, in the heater cut mode. Further, when the rotation angle of the rotor is in the region c in FIG. 2 at the time of the mode switch request, the rotor is rotated to shift the rotation angle to the region a in the same mode as the region c, that is, in the normal mode.

Further, for example, when the rotation angle of the rotor is in the region g in FIG. 2 at the time of the mode switch request, the rotor is rotated in a direction to increase the opening area between the branch channel 16a and the return channel 16 more (a direction to a more leftward side from the region g in FIG. 2) in the region g. Further, when the rotation angle of the rotor is in the region a in FIG. 2 at the time of the mode switch request, the rotor is rotated in a direction to increase the opening area between the branch channel 16a and the return channel 16 more (a direction to a more rightward of the region a in FIG. 2) in the region a.

[Specific Processing]

Next, with reference to FIG. 6, specific processing for realizing the aforementioned function will be described. FIG. 6 is a flowchart showing a mode switch determination routine that is executed by the ECU 40 in the second embodiment. Note that the routine shown in FIG. 6 is repeatedly executed at each predetermined control period immediately after a startup of the engine 10.

Figure 6:
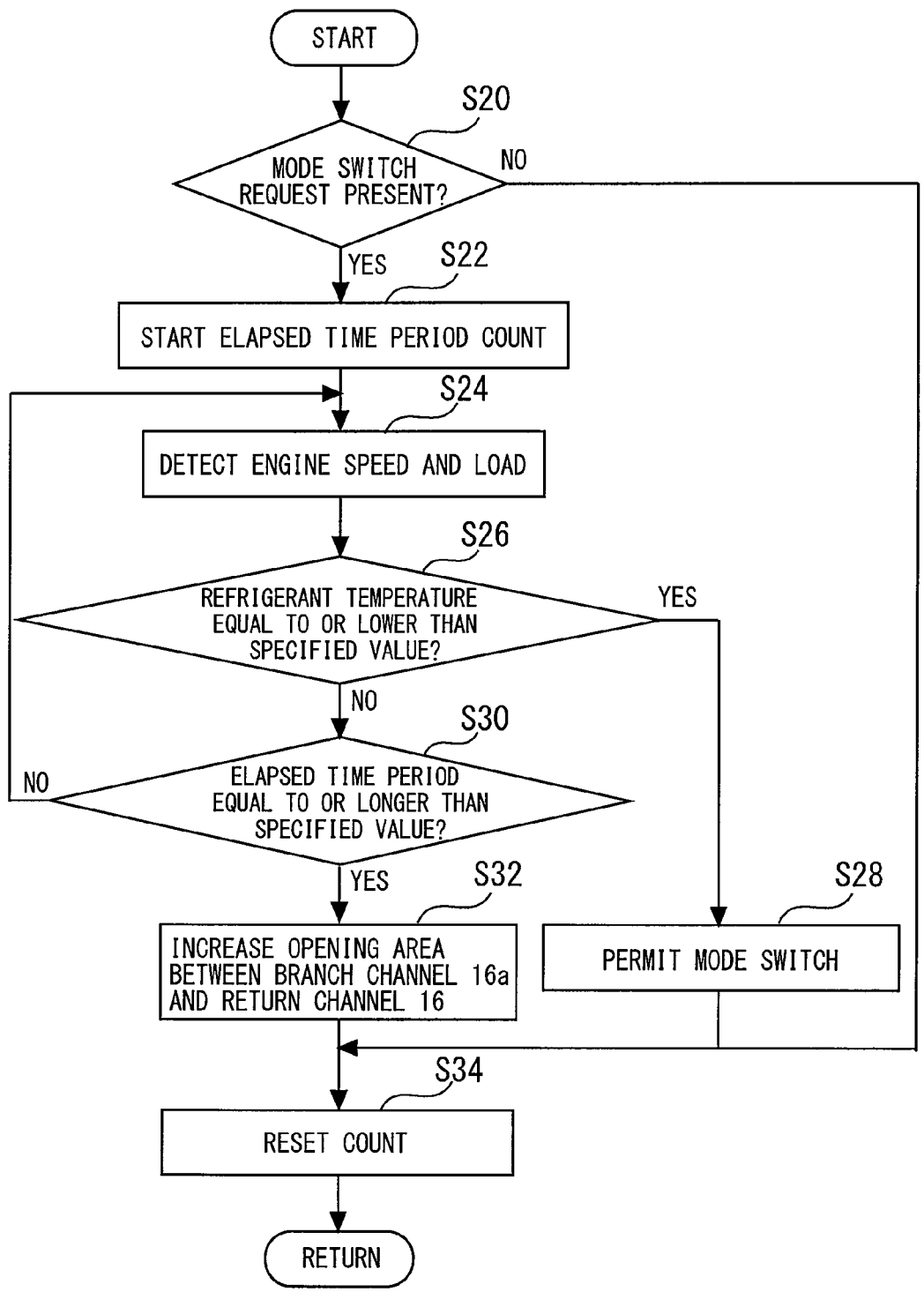
FIG. 6 is a flowchart showing a mode switch determination routine that is executed by the ECU 40 in the second embodiment.

In the routine shown in FIG. 6, presence or absence of a mode switch request is firstly determined (step S20). The processing in the present step is the same as the processing in step S10 in FIG. 4.

When it is determined that the mode switch request is present in step S20, count of an elapsed time period from a time point at which the mode switch request is issued is started (step S22), and the rotational speed and the load of the engine 10 are detected (step S24). The processing in step S24 is the same as the processing in step S12 in FIG. 4.

Subsequently to step S24, it is determined whether or not the temperature of the refrigerant is equal to or lower than the specified value (step S26). The processing in the present step is the same as the processing in step S14 in FIG. 4. When it is determined that the temperature of the refrigerant is equal to or lower than the specified value in step S26, it can be determined that a possibility of the refrigerant boiling is low even if the mode is switched. Therefore, switch of the mode is performed (step S28).

When the temperature of the refrigerant is higher than the specified value in step S26, it is determined whether or not the elapsed time period is longer than a specified value (step S30). The specified value which is used in the present step is set in advance as an allowable elapsed time period and is stored in the ECU 40. When it is determined that the elapsed time period is shorter than the specified value, the flow returns to step S24, and the rotational speed and the load of the engine 10 are detected. When it is determined that the elapsed time period is equal to or longer than the specified value, the rotor is rotated to increase the opening area between the branch channel 16a and the return channel 16 (step S32). Finally, the count of the elapsed time period is reset (step S34), and the present routine is closed.

As above, according to the routine shown in FIG. 6, when the elapsed time period from the time point at which the mode switch request is issued becomes equal to or longer than the specified value, the opening area between the branch channel 16a and the return channel 16 can be increased. That is to say, the temperature of the refrigerant is reduced in a short time period in the case like this, and the situation which is incapable of responding to the mode switch request can be eliminated at an early stage.

Note that in the above described second embodiment, the return channel 16, the branch channel 16a and the supply channel 14 correspond to a "first refrigerant circuit" in the above described second aspect.

The invention claimed is:

1. A refrigerant circulation system, comprising:
a first refrigerant circuit for returning a refrigerant that passes through a main body of an internal combustion engine to the main body after causing the refrigerant to perform heat exchange with a first heat exchanger;
a control valve that is provided in the first refrigerant circuit, and includes a rotor that rotates around a rotation axis;
a second refrigerant circuit that is connected to the control valve, and is for returning the refrigerant which passes through the main body to the main body after causing the refrigerant to perform heat exchange with a second heat exchanger; and
a controller programmed to control a rotational operation of the rotor, based on an operation plan that is set by relating opening and closing states of the first refrigerant circuit and the second refrigerant circuit with a rotation angle of the rotor from a reference position,
wherein the operation plan comprises an all passing mode that changes both channels of the first refrigerant circuit and the second refrigerant circuit from a state in which both the channels of the first refrigerant circuit and the second refrigerant circuit are closed to a state in which both the channels are opened, and a partial cutoff mode that changes both the channels from the state in which both the channels are closed to a state in which only the first refrigerant circuit is opened, wherein a rotation angle area corresponding to the all passing mode and a rotation angle corresponding to the partial cutoff area are separated from each other by a rotation angle are in which both the channels are closed, the controller is programmed to prohibit switch between the all passing mode and the partial cutoff mode, when a temperature of the refrigerant which passes through the main body is higher than an upper limit temperature of the refrigerant which is determined based on an operating state of the internal combustion engine, in a case where a mode switch request to switch the all passing mode and the partial cutoff mode via the rotation angle area in which both channels are closed is issued.

2. The refrigerant circulation system according to claim 1, wherein the control valve is configured to change an opening area of the first refrigerant circuit and an opening area of the second refrigerant circuit by the rotation of the rotor, the first heat exchanger is a radiator to cool the refrigerant by heat exchange with outside air, and the controller is programmed to rotate the rotor in a direction to increase the opening area of the first refrigerant circuit when an elapsed time period after the mode switch request being issued exceeds a predetermined time period in a case of prohibiting the switch between the all passing mode and the partial cutoff mode.

\* \* \* \* \*